(12) United States Patent
Ally et al.

(10) Patent No.: US 7,571,447 B2
(45) Date of Patent: Aug. 4, 2009

(54) LOOSE COUPLING OF WEB SERVICES

(75) Inventors: Afshan Ally, Markham (CA); Mark William Hubbard, Maple (CA); John Wright Stephenson, Blackstock (CA)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 11/156,402

(22) Filed: Jun. 20, 2005

(65) Prior Publication Data

US 2006/0288018 A1     Dec. 21, 2006

(51) Int. Cl.
*G06F 13/00*     (2006.01)
(52) U.S. Cl. .................. 719/330; 719/313; 719/315
(58) Field of Classification Search .......... 719/330, 719/313, 315
See application file for complete search history.

(56) References Cited

U.S. PATENT DOCUMENTS

| | | | |
|---|---|---|---|
| 6,434,598 B1 | 8/2002 | Gish | |
| 6,950,872 B2 * | 9/2005 | Todd, II | ............ 709/227 |
| 7,343,554 B2 * | 3/2008 | Waldorf et al. | ............ 715/234 |
| 2002/0004853 A1 | 1/2002 | Jones et al. | |
| 2002/0174241 A1 | 11/2002 | Beged-Dov et al. | |
| 2003/0046201 A1 | 3/2003 | Cheyer | |
| 2003/0070006 A1 | 4/2003 | Nadler et al. | |
| 2003/0110242 A1 | 6/2003 | Brown et al. | |
| 2007/0150546 A1 * | 6/2007 | Karakashian et al. | ....... 709/207 |

\* cited by examiner

*Primary Examiner*—Andy Ho
(74) *Attorney, Agent, or Firm*—Willy D. Rose, Esq.; Steven M. Greenberg, Esq.; Carey Rodriguez Greenberg & Paul LLP

(57) ABSTRACT

A Web services access management system which enables loosely coupled Web services can include a servlet configured to receive incoming request messages to access business logic and a mapping table associating different ones of the request messages with different business logic. Mapping logic can be disposed between the servlet and the business logic and configured to route at least part of the incoming request messages to selected ones of the business logic according to the mapping table. Finally, the system can include a response builder configured to build responses with data produced by the business logic responsive to processing incoming request messages routed by the mapping logic. In this regard, changes to the mapping logic can remain transparent to clients transmitting request messages and the business logic servicing the requests.

7 Claims, 2 Drawing Sheets

LOOSE COUPLING OF WEB SERVICES

BACKGROUND OF THE INVENTION

The present invention relates to the field of distributed computing, and more particularly to Web services.

Web services represent the leading edge of distributed computing and are viewed as the foundation for developing a truly universal model for supporting the rapid development of component based applications over the World Wide Web. Web services are known in the art to include a stack of emerging standards that describe a service oriented, component based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requester through the use of any supporting messaging protocol, including for example, the simple object access protocol (SOAP).

Referring to FIG. 1, a traditional Web services server 110 includes a servlet 140 disposed within a Web container 120 as a listener for a Web service request 160A from a Web services client 130 and to provide a response 160B to the Web services client 130. When the request 160A is received in the servlet 140, the message content of the request 160A, along with reflection logic, are used to create the target object of the message, and to select the correct method in an instance of business logic 150 on the object. Parameters to the method on the target object further are created using the encoded form of the message along with the methods of the reflection interface. Thus, the conventional Web services model couples the client interface to the server implementation of the service.

The flow of control, once the message 160A has been delivered to the servlet 140 is as follows:

1. Message delivered to the servlet.
2. Servlet determines the name of the class to service the message.
3. Servlet creates an instance of the class.
4. Servlet determines the name of the method to invoke on the class.
5. Servlet creates the parameters to the method from information in the message.
6. Servlet invokes the method passing the parameters created from the message.
7. Method returns with results.
8. Servlet encodes the results similar to the parameters sent in the message.
9. Servlet responds with the response message.

BRIEF SUMMARY OF THE INVENTION

In one embodiment, a Web services access management system can include a servlet configured to receive incoming request messages to access business logic and a mapping table associating different ones of the request messages with different business logic. Mapping logic can be disposed between the servlet and the business logic and configured to route at least part of the incoming request messages to selected ones of the business logic according to the mapping table. In this regard, changes to the mapping logic can remain transparent to clients transmitting request messages and the business logic servicing the requests.

Finally, the system can include a response builder configured to build responses with data produced by the business logic responsive to processing incoming request messages routed by the mapping logic. In one aspect of the invention, the incoming request messages can be SOAP messages transmitted over the hypertext transfer protocol (HTTP). Also, in another aspect of the invention, the mapping table can be disposed in a mapping template formatted according to the extensible markup language (XML). In yet another aspect of the invention, the business logic can be instances of classes in a Web services container. Finally, in yet a further aspect of the invention, the response builder can be a server page programmed to dynamically generate markup utilizing the data.

A Web services access management method can include receiving a Web services request message in a Web services servlet and identifying externally to the servlet business logic which corresponds to the request message. For example, the identifying step can include locating within a mapping table business logic corresponding to the request message. In any case, the identified business logic can be invoked externally to the servlet. Finally, a response message can be built externally to the servlet utilizing data produced by the invoked identified business logic. In one aspect of the invention, the method can additionally include extracting parameters from the request message, formatting the parameters according to the mapping table, and performing the invoking step utilizing the formatted parameters. Alternatively, the method can additionally include extracting selected parameters from the mapping logic and performing the invoking step utilizing the extracted selected parameters.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

Embodiments of the present invention provide a method, system and apparatus for providing a loosely coupled Web service server. In accordance with an embodiment of the present invention, a loosely coupled Web service server can include a servlet configured to receive Web service requests from requesting clients over a computer communications network. The servlet can be coupled to mapping logic programmed to match the requests with server-side business logic according to a mapping table. Finally, a response builder can be configured to package a response to the client with response data produced by the business logic in response to requests forwarded by the client to the servlet. In this way, while the external Web service interface to the clients can remain constant, the business logic interface can change and the changes can be accounted for in the mapping table utilized by the mapping logic.

Figure 1:
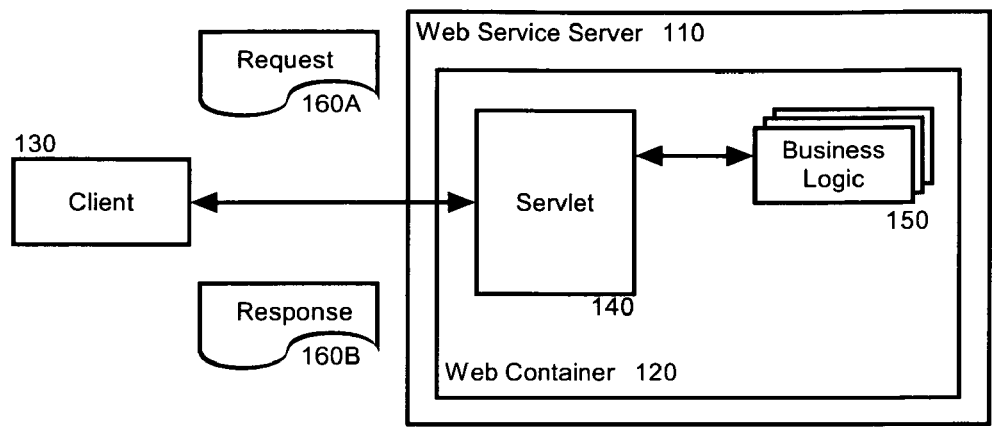
FIG. 1 is a schematic illustration of a conventional, tightly coupled Web service server architecture known in the art.
Figure 2:
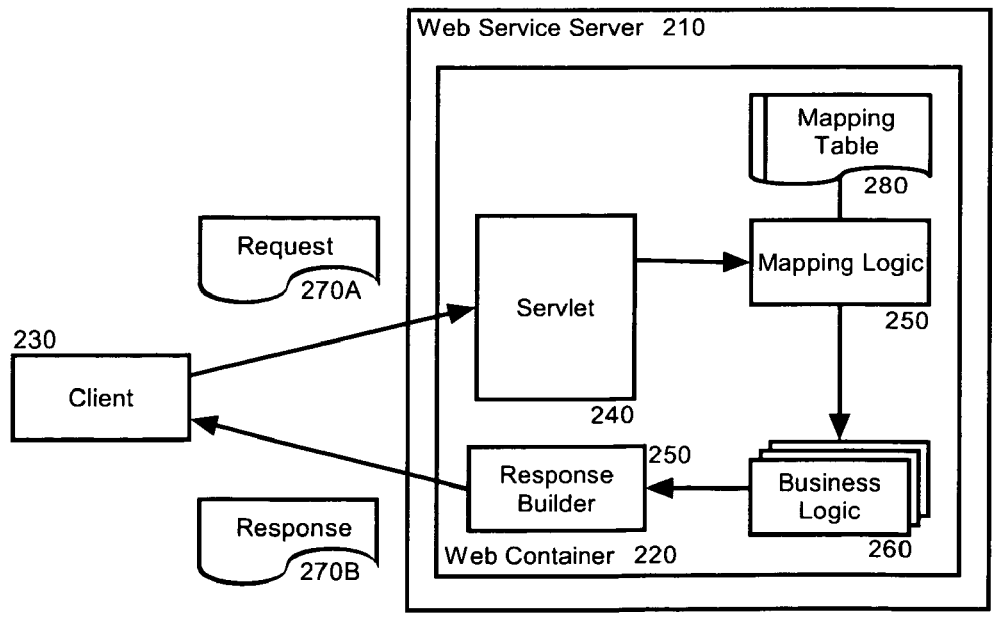
FIG. 2 is a schematic illustration of the loosely coupled Web service server architecture of the present invention; and, FIG. 3 is a flow chart illustrating a process for processing request messages in the loosely coupled Web service server architecture of FIG. 2.

In further illustration, FIG. 2 is a schematic illustration of the loosely coupled Web service server architecture of the present invention. The architecture of the present invention can include a Web service server 210 having a servlet 240 hosted within a Web container 220 and configured for communicative coupling to a Web services client 230 over a computer communications network. The Web service server 210 also can include mapping logic 250 programmed to route requests 270A to appropriate business logic 260 according to a mapping table 280. In this regard, the business logic 260 can include one or more classes disposed in the Web container 220. Finally, a response builder 250 can be included in the Web container 220 and configured to construct responses 270B based upon data provided by the business logic 260.

Specifically, the servlet 240 can accept a request 270A from the client 230. The request can be a SOAP message transmitted over HTTP. The servlet 240 can drive the mapping logic 250 which can be configured via the mapping table 260 to determine what business logic 260 supports the request 270A, and how the data in the request 270A should be passed to the business logic 260. Importantly, the mapping layer defined by the mapping logic 250 and mapping table 280 can be configurable independent of the interface to the servlet 240 and the business logic 260. For instance, the mapping table 280 can be disposed in a mapping template formatted according to XML. Thus, the mapping layer allows the business logic 260, which may have a completely different interface, to be replaced at will. Yet, the interface to the servlet 240 can remain unchanged.

Once the business logic 260 has completed processing the request 270A, the response builder 250 can process the resulting data, allowing a response 270B to be constructed. As an example, the response builder 250 can be a server page able to dynamically render markup incorporating the resulting data from the business logic 260. Still, like the mapping logic 250, the response builder 250 can be isolated from the servlet 240 and, therefore, the response builder 250 can be completely replaceable and configurable independent of the interface to the servlet 240.

Figure 3:
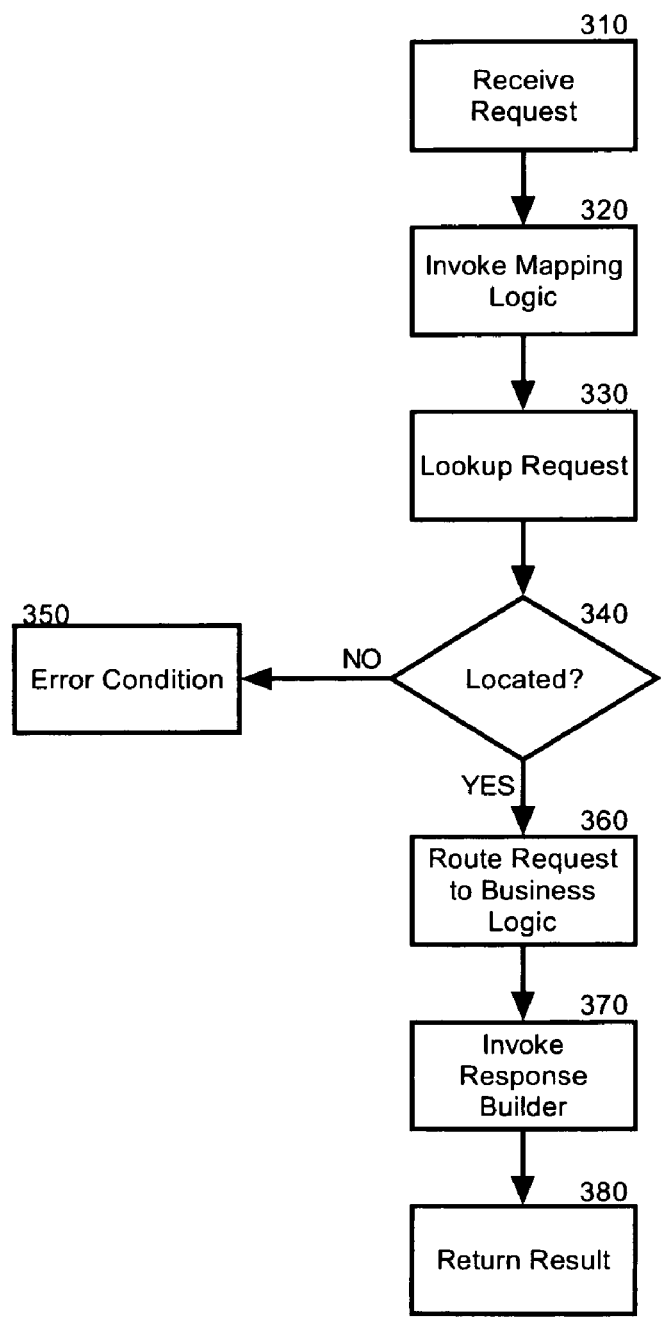

In further illustration, FIG. 3 is a flow chart illustrating a process for processing request messages in the loosely coupled Web service server architecture of FIG. 2. Beginning in block 310, a request can be received for a Web service. In block 320, the request can be forwarded to mapping logic. In block 330 a mapping template can be consulted to locate suitable business logic for processing the request. If in decision block 340, suitable business logic cannot be located, in block 350 no business logic need be invoked. Otherwise, the process can continue through block 360.

In block 360, the request can be routed to the business logic indicated by the mapping template. Additionally, parameters for the Web service request can be formatted as specified by the mapping template and provided to the business logic as part of the business logic call. Subsequently, in block 370 the response builder can be invoked with the result to produce response. Finally, in block 380 the response can be returned to the requesting client.

The skilled artisan will recognize that instead of mapping a client request to business logic within the servlet, in an embodiment of the present invention, the mapping can be abstracted into an explicit layer, which is configurable on its own accord. For example, the mapping template can be an extensible markup language document which can be modified without requiring large scale changes in program code. This abstraction can isolate the business logic layer from the interface, making the runtime architecture of the present invention more flexible than conventional Web service request processing. In consequence, a completely different request message can be allowed to access the same business logic due to the interjection of the mapping template. Conversely, the same request message can be routed to completely different business logic due to the interjection of the mapping template.

Finally, the intermediate role of the mapping logic can allow only those portions of an incoming message which are interesting to a business process to be passed to the business process. In this regard, in an embodiment of the present invention there need not be an automatic inflation of business objects on the server side. Rather, explicit steps can be taken to specify what portions of the incoming message are of interest to the business process. Also, constant data can be specified in the mapping logic to be provided to the business logic though the constant data would not have been included as part of received requests. Consequently, the relationship between the client and server can be less interdependent. As a result of this decoupled architecture, a dynamic decision can also be made when determining what business logic should support the Web Service and which messages drive which business processes.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

We claim:

1. A Web services access management method comprising:
   receiving a Web services request message in a Web services servlet executing in a Web services container in a Web services server;
   identifying, externally to said servlet, business logic corresponding to said request message;
   invoking said identified business logic externally to said servlet; and,
   building a response message, externally to said servlet in a response builder executing in the Web services container, utilizing data produced by said invoked identified business logic.

2. The method of claim 1, wherein receiving a Web services request message in a Web services servlet comprises receiving a simple object access protocol (SOAP) message transmitted over the hypertext transfer protocol (HTTP) in a SOAP configured servlet.

3. The method of claim 1, wherein identifying, externally to said servlet business logic, corresponding to said request message comprises locating within a mapping table business logic corresponding to said request message.

4. The method of claim 3, further comprising: extracting parameters from said request message; formatting said parameters according to said mapping table; and, performing invoking said identified business logic externally to said servlet utilizing said formatted parameters.

5. The method of claim 4, further comprising:
   extracting selected parameters from said request message;
   formatting said selected parameters according to said mapping table; and,
   performing invoking said identified business logic externally to said servlet utilizing said formatted selected parameters.

6. The method of claim 1, further comprising:
   extracting selected parameters from said mapping table; and,
   performing invoking said identified business logic externally to said servlet utilizing said extracted selected parameters.

7. The method of claim 1, wherein building a response message, externally to said servlet, utilizing data produced by said invoked identified business logic comprises invoking a server page programmed to dynamically generate markup utilizing said data.

* * * * *